May 21, 1940. E. E. KELLEY 2,201,183
MACHINE TOOL
Filed Aug. 31, 1938 2 Sheets-Sheet 2
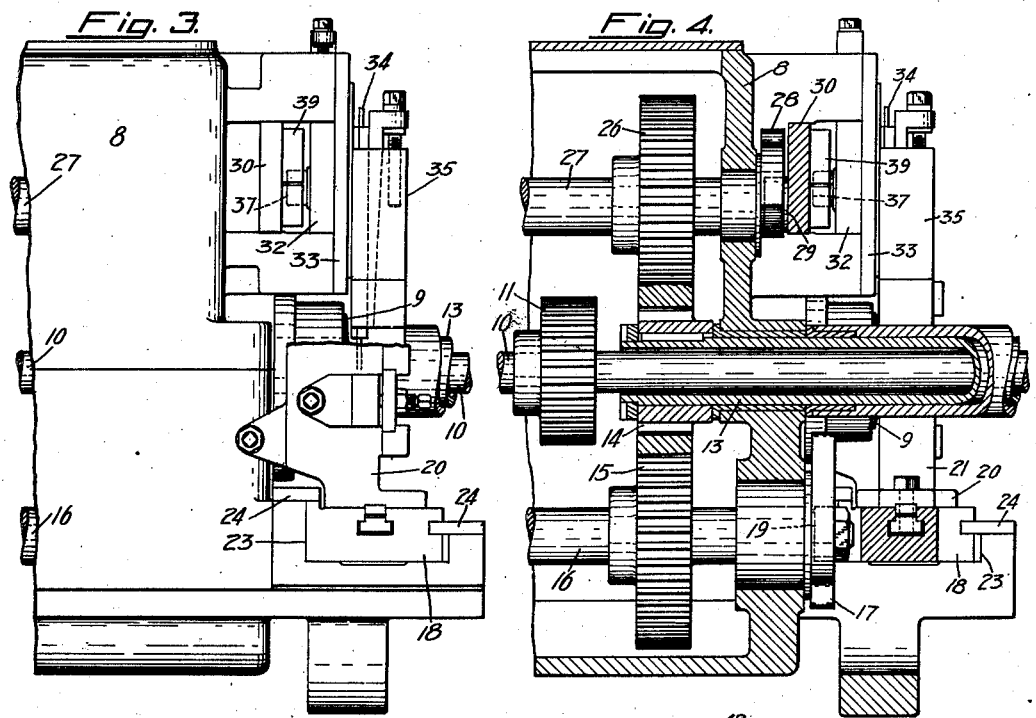
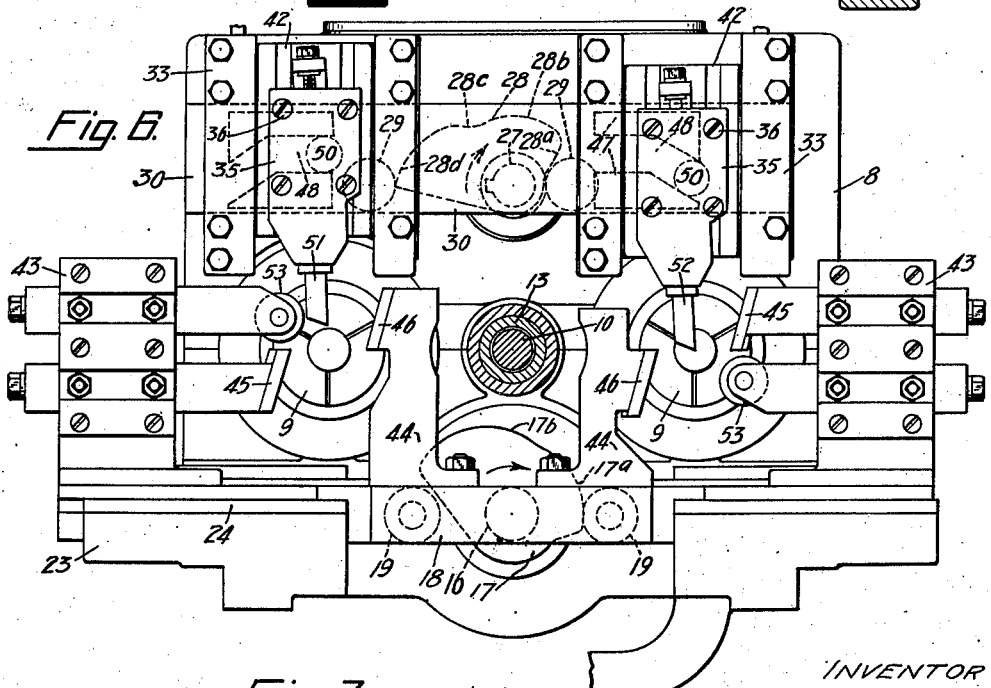
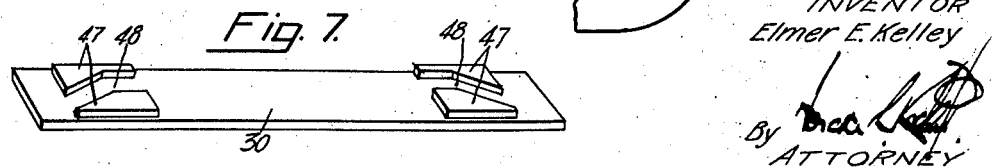
INVENTOR
Elmer E. Kelley
By
ATTORNEY Patented May 21, 1940

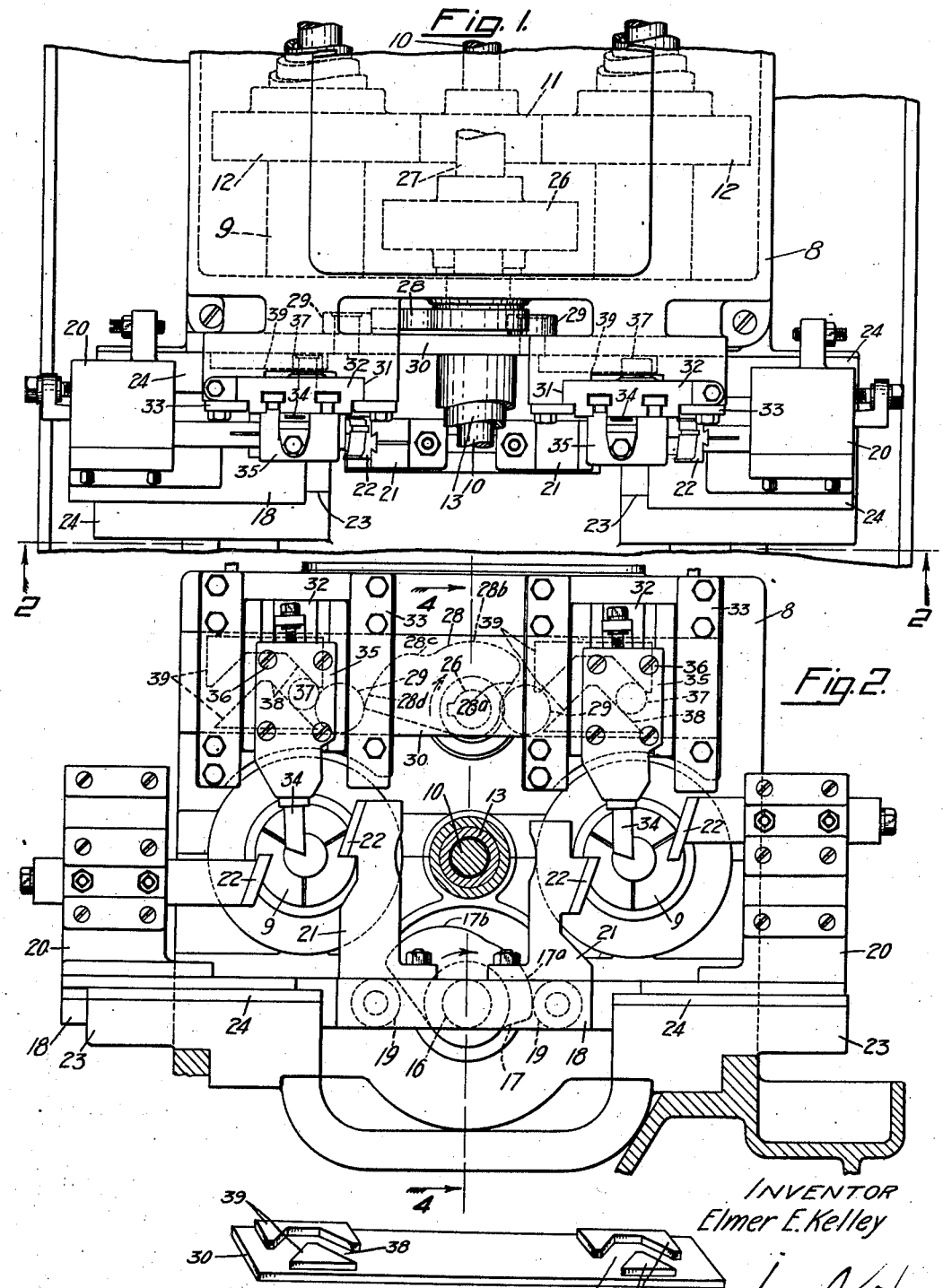

2,201,183

UNITED STATES PATENT OFFICE 2,201,183

MACHINE TOOL

Elmer E. Kelley, Windsor, Vt.

Application August 31, 1938, Serial No. 227,734

20 Claims. (Cl. 82—3)

This invention relates to tool operating mechanisms for machine tools of the type known as automatic screw machines.

The invention has among its general objects, the provision, in an automatic machine, of an improved arrangement of tool operating mechanisms for forming tools, cutting-off tools and the like, whereby the cutting-off tool may function in cooperation with the other tools in a manner to produce machined articles of a higher standard of accuracy and quality; and to provide improved tool operating mechanisms accommodating a greater number of tools, affording a wider range of variation of the types of work and permitting the performance of a larger number of operations on a work piece.

In the operation of machines of the automatic character, the proper coordination of operation of the various tools on the work is of appreciable importance to produce an accurately finished article, and, more particularly, to assure a close sequence in the operation of the several tools. In view of the foregoing, it is a further object of the invention to provide an improved tool operating mechanism which will assure the accurate manipulation of the cutting-off tool, for example, to such an exact degree that the operation of same may be so closely coordinated with the operation of other tools as to produce an accurate article in a minimum of time.

In a more specific aspect, the invention seeks to provide an improved tool operating mechanism primarily adapted for cutting-off tools, in an arrangement which permits operation of these tools by means independent of the operation of the other tools of the machine, such as forming tools, notwithstanding a positive operative association of cutting-off tool mechanism with the operating mechanism of the other tools; to assure a proper sequence or coordination of the several tools in producing the article.

Another object is to provide a tool operating mechanism adapted for use on a multiple spindle automatic machine of the so-called two-at-a-time type shown in my copending application Serial No. 226,289, filed August 23, 1938, which machine is so organized as to accomplish corresponding operations simultaneously on the work of each spindle thereof; and to provide, in a machine of this character, an improved tool operating mechanism operable by a single reciprocatory element by which the corresponding tools of all of the spindles, such as the cutting-off tools, are actuated simultaneously, to be advanced to the work and retracted therefrom concomitantly, although each tool has its individual tool slide affording an accurate and dependable mounting for the tool.

A further object of my invention resides in the provision of an improved tool operating mechanism adapted for use on multiple spindle automatic machines of the so-called standard type shown in my prior Patent No. 1,892,239, issued December 27, 1932, in which a corresponding operation is accomplished successively on the work in the several spindles; and a mechanism for the operation of other tools in cooperation with the usual tool equipment of such machines, the improved mechanism being intended primarily to operate the cutting-off tools and functioning to present the respective cutting-off tools alternately or successively to the work of the respective spindles, in harmony with operation of the other tools.

A still further object is to provide a mechanism for the actuation of machine tools, readily adaptable for operation on either type of machine above indicated, and so organized as to be capable of manufacture in one form, that is, for operation on one type of machine, and having the tool actuating elements therein so arranged as to be readily convertible for the mode of operation used on a machine of the other type, for which the mechanism is intended.

These and other objects and advantages will hereinafter more fully appear.

In the accompanying drawings, I have shown for purposes of illustration two embodiments which my invention may assume in practice.

In these drawings:

Figure 1 is a fragmentary plan view of such a two-at-a-time machine embodying one form of my invention;

Fig. 2 is an elevational view taken on a transverse plane 2—2 of Figure 1 and looking in the direction of the arrows;

Fig. 3 is a side elevation of the machine of Figure 1;

Fig. 4 is a central vertical sectional view taken on line 4—4 of Figure 2;

Fig. 5 is a detail perspective view of the transverse slide bar for actuating the vertical tool slides of the first form of my invention;

Fig. 6 is an elevational view similar to Figure 2 but illustrating a modified form of my invention applied to such a standard machine, and Fig. 7 is a view similar to Figure 5 but showing the transverse slide bar as employed in the modified form of my invention.

As indicated, the improvements herein set forth are adapted for use on machines of the automatic type shown and described in my copending application Serial No. 226,289 and shown in my prior Patent No. 1,892,239. To illustrate the organization and cooperation of my improvements with these machines, I have shown in the drawings the related mechanisms and elements of the respective machines.

Referring first to the illustrative construction embodying the first form of my invention illustrated in Figures 1 to 5, inclusive, the portions of the so-called two-at-a-time machine shown in my copending application, to which the present invention is associated, will be described. The machine comprises a head stock 8 on which a plurality or pair of work spindles 9 are rotatably mounted, each of these spindles being equipped with the usual automatically operable work gripping and feeding mechanism by which a rod of stock is gripped and rotated during operation of the tools thereon, and upon completion of the finished product, the stock rod is advanced in the spindles to present a new length of stock to the operating tools. The mode of operation obtaining in the first form is such that a corresponding tool operation is accomplished on each work rotating spindle and the feed mechanisms of the respective spindles are accordingly actuated simultaneously, so that each spindle is accomplishing a corresponding operation at the same time, and each spindle is feeding a new length of stock at the same time.

The construction and operation of the gripping and feeding mechanism on each of the spindles is well-known, and may be that shown and described in my prior patent, it being noted, however, that in the first embodiment of my invention herein illustrated, the feed mechanisms of the respective spindles are actuated simultaneously to feed a new work piece into the tool region at each spindle. It is also to be noted that the work feeding and gripping mechanisms are operated in proper timed relation with the several tool mechanisms hereinafter described, so that as the latter mechanisms complete their operations and subsequently sever the finished product from the work rods, the gripping and feeding mechanisms function to supply new work pieces.

It is preferred that the rotation of the spindles and the drive of the tool mechanisms be effected by drive elements forming part of the machine shown in my patent and illustrated in part herein. The respective spindles 9 are driven from a central shaft 10 journalled in the head stock 8 between the spindles and extending longitudinally of the machine, this central shaft being driven by a suitable mechanism contained within a gear box, not shown, at the end of the machine opposite that of the head stock 8. The shaft 10 has secured thereto a drive gear 11 in mesh with driven gears 12 on each of the spindles 9, to rotate the spindles constantly during operation of the machine.

The several tool mechanisms hereinafter described are preferably driven by a drive tube 13 journalled in the head stock 8, surrounding the central shaft 10, and also extending therewith longitudinally of the machine to be actuated by the mechanism within the mentioned gear box. The drive tube 13 has affixed thereto a drive gear 14 in mesh with a driven gear 15, the latter being secured to a cam shaft 16 journalled in the head stock 8 and carrying on its projecting end, a tool slide actuating cam 17.

Rotation of the cam 17 by the gear train just described, serves to actuate a transverse tool slide 18 in a reciprocatory movement, the cam 17 cooperating with a pair of rolls 19 to actuate the tool slide. The tool slide 18 has outer tool posts 20 and intermediate tool posts 21 adjustably mounted thereon, which posts operatively support a series of tools 22 movable transversely of the machine to or from the work in the respective spindles. It is to be observed that each spindle has a pair of corresponding tools, each of these tools being arranged to accomplish a corresponding operation such as that of forming, the respective tools of each pair being presented to the work of a given spindle alternately. To accomplish this mode of operation, it is, of course, required that the timing of the work gripping and feeding mechanism be such that for each presentation of a tool to the work, a new work piece is fed into the tool region, as hereinafter further described. The tool slide 18 is guided for transverse movement relative to the work spindles, being slidable in suitable ways 23 provided on the base of the machine adjacent the head stock 8 and retained therein by gibs 24.

Improvements herein are directed to the provision of a vertically operable tool actuating mechanism, to serve in cooperation with the series of tools 22 so as to actuate tools carried thereby, intended primarily as cutting-off tools, to sever the finished article formed by the tools 22. The mechanism for actuating the cutting-off tools is driven from the same source as the tool slide 18, namely the central drive tube 13 and the drive gear 14 thereon, which gear has in mesh therewith a driven gear 26 secured to a second cam shaft 27 journalled in the head stock 8 and having affixed to a projecting end thereof, an actuating cam 28 cooperating with a pair of rolls 29 carried on a transverse slide bar 30, the latter being mounted for reciprocatory movement on the head stock 8 substantially in parallelism with the transverse tool slide 18.

The upper portion of the head stock 8 is formed to provide guideways 31 for a plurality of vertical tool slides 32, one for each spindle 9, the tool slides being retained in the ways 31 by gibs 33. Each tool slide 32 includes suitable means for clamping a tool 34 thereon, as by a tool holder 35 secured by bolts 36 to the tool slide 32.

The gear train 14, 26 rotates the cam 28 which, in cooperation with the rolls 29, causes the transverse slide bar 30 to be reciprocated. Each tool slide 32 has operatively mounted thereon a roll 37, each roll being ridable in a cam slot 38 formed by complemental cam pads 39 affixed to the transverse slide bar 30. It may be here noted that each of the cam slots 38 assumes an inverted V-form presenting oppositely inclined portions, so that as the slide bar 30 is moved in one direction a complete stroke, each of the rolls 37 and the vertical tool slides carrying same are caused to be raised and lowered a complete reciprocatory stroke.

The above outlined arrangement of the cam slots 38 in relation to the tool slides 32 is desired in order to provide the proper coordination of operation of the tools 34 with the tools 22 on the transverse tool slide 18. As afore indicated, the respective tools 22 of each pair are presented to the work in the spindles 9 alternately. Thus, the right-hand tool 22 of each pair is advanced to the work piece to form same, and concomitantly with the advancement of the right-hand tool 22 or immediately succeeding the same, the vertically movable tool 34 is advanced into the work to sever the finished article from the stock rod. As the cutting-off operation is completed the right-hand tool 22 is at an intermediate point in its retracting stroke, and the left-hand tool 22 is at an intermediate point in its advancing stroke, the cutting-off tool 34 having completed its cutting operation with the two tools 22 in their respective medial positions in which the right-hand roll 19 engages the cam surface 17a. As the machine continues its operation, the abrupt cam surface 28a on cam 28 engages roll 29, quickly raising the tools 34, and the usual feeding and gripping operations of the stock rods then take place. During these latter operations the tools 22 and 34 remain stationary and out of contact with the work, the rolls 19 and 29 passing over arcuate dwell surfaces 17a and 28b on their respective cams. The left-hand tools 22 are then advanced to the work as the cam face 17b engages the right-hand roll 19, and as the left-hand tool 22 completes its forming operation and begins its retracting stroke, the tools 34 are lowered to cut off the finished articles. It will therefore be seen that the vertical tool slides 32 are each raised and lowered twice for each complete reciprocatory movement of the transverse tool slide 18. The cam 17 and the cam 28 are each rotated substantially at the same speed, these cams, however, being in such angular relation as to provide the desired coordination of the respective tool series, as just described, the double stroke of the vertical tool slides 32 in reference to the horizontal tool slide 18 being had by the inverted V-form for the actuating cam slots 38.

Attention is now directed to Figures 6 and 7 for a description of the modified form of my invention, it being noted that this form is particularly adapted for use on machines of the type shown in my aforesaid prior patent, being illustrated herein in cooperation with the several series of horizontally movable tools usually incorporated in machines of this type. However, in contrast with the mode of operation had in the machine of the first form, it will be observed that the arrangement of the horizontally movable tools and the timed operation thereof is such that a corresponding operation is performed on the respective spindles alternately. Although the modified embodiment of my invention illustrated in Figure 6 includes two horizontally movable forming tools for each spindle, it is to be noted that these tools do not correspond, but differ from each other, each tool being adapted to perform a substantially different operation.

It will be noted in general that the respective tool actuating mechanisms in the modified form are arranged in a manner substantially similar to that in the first form. In the modified form, the machine may also include the central drive tube 13 for actuating the horizontally movable transverse tool slide 18 through the gear train 14, 15, the shaft 16 and the cam 17 cooperating with the rolls 19. The vertical tool slides indicated by numeral 42 are actuated by a somewhat similar mechanism including the gear 26, cam 28 cooperating with rolls 29 and the transverse slide bar 30.

The tool slide 18 is similarly provided with outer tool posts 43 and intermediate tool posts 44 on which the tools required for various operations are mounted. As afore indicated, the respective tools operating on the work of one spindle differ substantially in the nature of the operation performed. For example, tool 45 may be a forming tool for shaping the contour of the article, while tool 46 may accomplish a slotting or undercutting operation, these tools operating successively on the same work piece. The mode of operation practiced on machines of this type is such that while the tool 45 is operating on the work of one spindle, the work of the other spindle is being simultaneously operated on by tool 46, and vice versa. The work gripping and feeding mechanism of each spindle is operated alternately to accommodate this mode of operation of the tools, and as a result, only one finished article is produced for each cycle of the machine, the first being produced, for instance, on the right-hand spindle, and the second or succeeding work piece being produced on the left-hand spindle.

This mode of operation requires that the vertically movable tools be presented to the work in the respective spindles also alternately, as contrasted with the vertical tool slide operation in the first form in which both tools are raised and lowered in unison. The alternate operation of the tool slides 42 is effected by providing complemental cam pads 47 for each of the tool slides, presenting each a cam slot 48 for cooperation with the respective rolls 50 on the tool slides. The cam slots 48 have each an inclined portion, the incline of one cam slot being directed oppositely to that of the other. The cam slots 48 have each a horizontal portion contiguous with the inclined portion. The shape of each cam slot 48 is such that as the slide bar 30 is moved in one direction, one tool slide is moved to raised position, while the other tool slide remains in its raised position, during half of the stroke of bar 30, and during the remaining half of the stroke the previously raised slide is retained in raised position while the other tool slide is lowered.

It will thus be seen that as the tool 46 completes the required operations on the left-hand work spindle, assuming that this tool succeeds tool 45 in its function, the cutting-off tool 51 of this spindle is being lowered into the work to sever the finished article from the stock rod, these various operations of tools 45, 46 and 51 representing one cycle of the machine. The respective tools 45, 46, 52 of the right-hand spindle operate in substantially the same manner, it being noted that as the tool 46 of the right-hand spindle is being advanced to the work to complete operations thereon, the tool 46 of the left-hand spindle is being retracted from the work and at the same time, tool 45 of the left-hand spindle is being advanced to the work. Likewise, as tool 52 of the right-hand spindle is being lowered to cut off the finished article, the corresponding tool 51 of the left-hand spindle is being raised from the work. It will, of course, be noted that while all of the tools of both spindles are in either an intermediate or fully retracted position, the work gripping and feeding mechanism of one of the spindles is functioning to feed a new length of stock into the tool region to replace the finished article severed by the cutting-off tool at that spindle.

Cam 28 is substantially identical for either form of the invention, and its contour is so shaped as to cause the cutting-off tools in their retracting stroke to be moved rapidly, and after being retracted, to be retained in raised position for a certain period of time during which the previously mentioned feeding and gripping of the stock rod takes place, to be then lowered first rapidly into proximity to the work and then more slowly to accomplish the cutting-off operation. The rapid raising of the tools is effected by the abrupt radial portion 28a of the cam as same rotates in a clockwise direction, the contiguous arcuate portion 28b of the cam comprising a dwell surface causing the tools to remain at rest in their raised positions, portion 28c of the cam effecting the rapid lowering of the tools into proximity to the work and the cam surface 28d effecting the gradual lowering of the tools during the actual cutting operations thereof.

With reference to Figure 2, regarding this mode of operation as occurring in the first form of the invention, it will be observed that as the transverse slide bar 30 is moved rapidly to the right, actuated by the abrupt portion 28a of the cam 28, each roll 37 rides up the right-hand incline of the cam slot 38 to the high point of the cam slot. Each roll 37 remains at this high point for a dwell period, due to the arcuate portion 28b of the cam 28. As cam 28 continues to rotate and thereby move slide bar 30 further to the right, each roll 37 rides down the left-hand incline of the cam slot 38, and the tool slides 32 are each thereby first rapidly and then gradually lowered by the successive cam surfaces 28c and 28d acting on the right-hand roll 29.

In the modified form, Figure 6, cam 28 actuates the slide bar 30 in substantially the same manner, and the movement of each tool slide 42 is substantially similar. However, the shape and direction of the respective cam slots 48 are such that while one tool is being raised during the first half of the stroke of slide bar 30, the other tool slide is retained in raised position, due to the flat portion of its cam. As the slide bar 30 completes its stroke, the tool slide which has just been raised, is retained in raised position while the other tool slide is gradually lowered.

In addition to the tool equipment heretofore described for use in the modified form of my machine illustrated in Figure 6, I may further employ knurling tools 53 to produce an article requiring this type of finish.

While in the preceding description of operation I have set forth the use of the vertical tool slides as being intended primarily for the operation of cutting-off tools, it will be apparent that other tools, or combinations of tools, may be mounted thereon, as, for example, a knurling tool, or a cutting-off tool and a knurling tool together.

Considering the general organization of the tool equipment on the machine, it will be seen that my improved arrangement of the tool operating mechanisms affords certain appreciable advantages in the use of the machine. One salient advantage is had in the provision of accommodations for additional tools to operate on the work to thereby enlarge the scope of work that may be accomplished on the machine. Specifically, by providing a separate and independent mounting for the cutting-off tools on a vertical tool slide, the usual transverse tool slide may accommodate other tools, as for knurling or finishing, and the like.

With regard to the particular arrangement of the vertical tool slides and the actuating mechanism therefor, it will be seen that the same is capable of operating in a substantially improved manner, in that the actuating mechanism for each of the vertically movable tools is so arranged as to minimize the occurrence of any backlash in feeding the tool to the work, the actuating means being applied directly to the tool slide without the need of any intermediate elements for transmitting the motion from the actuator to the tool slide. In other words, by my improved tool actuating mechanism, the operator can be assured of a certain, exact advance and retraction of the tool, and therefore is relieved from the necessity of compensating in any manner, as by the use of positive stops to tension the transmitting mechanism, for the usual backlash or looseness occurring in the more complicated tool actuating mechanisms heretofore employed.

The above advantage of tool manipulation is particularly valuable when considered in cooperation with other tools of the automatic machine, notably the tools operating axially upon the work, such as boring, tapping or reaming tools. For the production of a tubular product involving a boring operation, the cutting-off tool may actually function during the boring operation and be so accurately timed that the finished article may be severed substantially at the same instant the boring operation is completed. Such close sequence or actual overlapping of the two operations may be had by my improved tool operating mechanism, in that the mechanism may be depended upon to advance the cutting-off tool radially into the work and to stop same at the exact position to avoid interference with the boring tool, although being sufficiently advanced to completely sever the work without leaving any objectionable fin thereon.

The positive and accurate manipulation of the cutting-off tools is of further advantage in conjunction with the operation of forming tools such as may be carried on the transverse tool slide, in the production of articles which involve the accurate registry of the previously formed work piece with the advancing cutting-off tool. In work of an exact nature, it is required that the cutting-off operation be done in such manner as to exactly register with certain portions of the contour of the work produced by the forming tool, and such accuracy is assumed in the tool operating mechanism of the present invention.

While I have in this application specifically described two embodiments which my invention may assume in practice, it will be understood that the same are shown for purposes of illustration, and that my invention may be modified and embodied in other forms without departing from its spirit or the scope of the appended claims.

What I claim as new and desire to secure by Letters Patent is:

1. In a machine of the class described, the combination with a plurality of parallel work rotating spindles, of a plurality of tool slides movable transversely of the axes of said spindles, said spindles and a slide cooperating with each of the latter being horizontally disposed, and the other slides being vertically disposed and cooperating with different spindles, and means for driving all of said tool slides in timed relation from a common drive including a driving member located between said vertically disposed slides and actuating the latter.

2. In a machine of the class described, the combination with a pair of work rotating spindles having their axes in a common plane, of a pair of tool slides, one for each spindle, slidable in paths parallel with each other and in a common plane normal to the plane including the axes of said spindles, and means for actuating said tool slides in timed relation including a driving member located above said spindles and having an operative connection with both of said slides.

3. In a machine of the class described, the combination with a plurality of work rotating spindles having their axes in a common plane, of a plurality of tool slides, one for each spindle, slidable in paths parallel with each other and in a common plane normal to the plane including the axes of said spindles, an actuator bridging the space between said spindles and reciprocable transversely of the paths of said tool slides, and operative connections between said actuator and each of said tool slides for actuating the tool slides in timed relation.

4. In a machine of the class described, the combination with a plurality of work rotating spindles having their axes in a common plane, of a plurality of tool slides, one for each spindle, slidable in paths parallel with each other and in a common plane normal to the plane including the axes of said spindles, an actuator bridging the space between said spindles and reciprocable transversely of the paths of said tool slides, operative connections between said actuator and each of said tool slides for actuating the tool slides in timed relation, and a single operative connection to said actuator for reversely actuating the same.

5. In a machine of the class described, the combination with a plurality of work rotating spindles having their axes in a common plane, of a plurality of tool slides, one for each spindle, slidable in paths parallel with each other and in a common plane normal to the plane including the axes of said spindles, a slide bar bridging the space between said spindles and movable transversely of the paths of said tool slides, a cam and follower device between said slide bar and each of said tool slides, and means acting on said bar between the ends thereof for reciprocating said slide bar.

6. In a machine of the class described, the combination with a plurality of work rotating spindles having their axes in a common plane, of a plurality of tool slides, one for each spindle, slidable in paths parallel with each other and in a common plane normal to the plane including the axes of said spindles, a slide bar movable transversely of the paths of said tool slides, a cam and roll device between said slide bar and each of said tool slides, each of said cams having oppositely inclined portions to advance and retract each tool slide during movements of said slide bar in one direction.

7. In a machine of the class described, the combination with a pair of work rotating spindles having their axes in a common plane, of a pair of tool slides slidable in paths parallel with each other in a common plane normal to the plane including the axes of said spindles, a slide bar slidable transversely of the paths of said tool slides, a cam and roll device between said bar and each of said tool slides, each of said cams presenting corresponding inclined portions to actuate the respective tool slides in unison, and means for reciprocating said slide bar.

8. In a machine of the class described, the combination with a pair of work rotating spindles having their axes in a common plane, of a pair of tool slides slidable in paths parallel with each other in a common plane normal to the plane including the axes of said spindles, a slide bar slidable transversely across the paths of said tool slides, and a cam and roll device between said bar and each of said tool slides, said cams presenting oppositely inclined portions to actuate the respective tool slides in opposite directions.

9. In a machine of the class described, the combination with a plurality of work rotating spindles having their axes in a common plane, of a series of tool slides, one for each spindle, slidable in paths parallel with each other and in a common plane normal to the plane including the axes of said spindles, a slide bar movable transversely across the paths of said tool slides and having a plurality of cams thereon, each of said tool slides having a roll engaging one of said cams, and means for reciprocating said slide bar.

10. In a machine of the class described, the combination with a plurality of work rotating spindles having their axes in a common plane, of a series of tool slides, one for each spindle, slidable in paths parallel with each other and in a common plane normal to the plane including the axes of said spindles, a slide bar movable transversely across the paths of said tool slides, a plurality of cams on said bar and each actuating a different tool slide, and means acting on said slide bar between the cams for different tool slides for reciprocating said slide bar.

11. In a machine of the class described, the combination with a plurality of work rotating spindles, of a first tool slide bridging the space between said spindles adapted to hold a plurality of tools thereon and movable transversely of the axes of said spindles, means for actuating said tool slide, a plurality of second tool slides, one for each spindle, movable in a path at an angle to the path of said first tool slide, and a single means for actuating the second tool slides.

12. In a machine of the class described, the combination with a plurality of work rotating spindles, of a first tool slide movable transversely to the axes of said spindles and adapted to hold a plurality of tools thereon for presentation to the work in said spindles, means for reciprocating said tool slide, a plurality of second tool slides movable in paths normal to the path of said first tool slide and adapted to hold tools thereon for presentation to the work of said spindles, means for actuating said second tool slides in timed relation with each other, including a slide bar bridging the space between said spindles movable in parallelism with said first tool slide, and operative connections between said slide bar and each of said second tool slides.

13. In a machine of the class described, the combination with a plurality of work rotating spindles, of a first tool slide movable transversely of the axes of said spindles and adapted to hold a plurality of tools thereon for presentation to the work in different spindles, a plurality of second tool slides movable in paths normal to the path of said first tool slide and adapted to hold tools thereon for presentation to the work of said spindles, a slide bar movable in parallelism with said first tool slide, operative connections between said slide bar and each of said second tool slides, and rotary means for reciprocating said first tool slide and said slide bar cooperating to actuate the respective groups of tools in timed relation.

14. In a machine of the class described, the combination with a plurality of work rotating spindles, of a first tool slide movable transversely of the axes of said spindles and adapted to hold a plurality of tools thereon for presentation to the work in said spindles, a plurality of second tool slides movable in paths normal to the path of said first tool slide and adapted to hold tools thereon for presentation to the work of said spindles, a slide bar movable in parallelism with said first tool slide, operative connections between said slide bar and each of said second tool slides, and rotary cam means cooperating with said first tool slide and said slide bar and acting on each of the same between the ends thereof to actuate the respective groups of tools in timed relation.

15. In a machine of the class described, the combination with a plurality of work rotating spindles, of a first tool slide movable transversely of the axes of said spindles and adapted to hold a plurality of tools thereon for presentation to the work in said spindles, a plurality of second tool slides movable in paths normal to the path of said first tool slide and adapted to hold tools thereon for presentation to the work of said spindles, a slide bar movable in parallelism with said first tool slide, operative connections between said slide bar and each of said second tool slides, means for reciprocating said first tool slide including a rotary cam and rolls on said first tool slide, means for reciprocating said slide bar including a rotary cam and rolls on said slide bar, and common means for rotating said cams.

16. In a machine of the class described, the combination with a plurality of work rotating spindles having their axes in a common horizontal plane, of a first tool slide movable transversely of the axes of said spindles and adapted to hold a plurality of tools thereon for presentation to the work in said spindles, a plurality of second tool slides movable in paths normal to the path of said first tool slide and adapted to hold tools thereon for presentation to the work of said spindles, a slide bar movable in parallelism with said first tool slide, operative connections between said slide bar and each of said second tool slides, a cam rotatably mounted below the plane of said spindles and cooperating with rolls on said first tool slide to reciprocate same, a second cam rotatably mounted above the plane of said spindles and cooperating with rolls on said slide bar, a drive shaft interposed between said spindles, and driving connections between said drive shaft and said first and second cams.

17. In a machine of the class described, the combination with a plurality of work rotating spindles, of a horizontally movable tool slide slidable transversely to the axes of said spindles, corresponding tools for said spindles carried on said tool slide, means for reciprocating said tool slide to present the tools alternately to the work of said spindles, a plurality of vertically movable tool slides, one for each spindle having each a tool thereon, and means for actuating said vertical tool slides in unison, said horizontal tool slide reciprocating means and said vertical tool slide actuating means having means for actuating them in timed relation with each other, whereby to reciprocate the tools of both vertical slides in both directions for each unidirectional movement of the tools on the horizontal tool slide.

18. In a machine of the class described, the combination with a pair of work rotating spindles, of a horizontally movable tool slide slidable transversely to the axes of said spindles, a tool for each spindle carried on said tool slide on opposite sides of the axes of the respective spindles, means for reciprocating said tool slide to present said tools successively to the work in the respective spindles, vertically movable tool slides, one for each spindle, having each a tool thereon, and means for actuating the respective vertical tool slides alternately, said horizontal tool slide reciprocating means and said vertical tool slide actuating means having means for actuating them in timed relation with each other to reciprocate a tool of each vertical slide in sequence to the movement of each tool on said horizontal tool slide.

19. In a machine of the class described, the combination with a pair of work rotating spindles, of a horizontally movable tool slide slidable transversely to the axes of said spindles, a pair of corresponding tools for each spindle carried on said tool slide, means for reciprocating said tool slide to present the respective tools of said pairs alternately to the work of said spindles, a pair of vertically movable tool slides, one for each spindle having each a tool thereon, a vertical tool slide actuating cam slide, and mechanism for actuating said cam slide and horizontal tool slide in timed relation.

20. In a machine of the class described, the combination with a pair of work rotating spindles, of a horizontally movable tool slide slidable transversely to the axes of said spindles, a pair of corresponding tools for each spindle carried on said tool slide, means for reciprocating said tool slide to present the respective tools of said pairs alternately to the work of said spindles, a pair of vertically movable tool slides, one for each spindle having each a tool thereon, a vertical tool slide actuating cam slide, and mechanism for actuating said cam slide and horizontal tool slide in timed relation including means for inserting a dwell in the movement of said slides intermediate the actuation thereof to permit feeding of the stock rod.

ELMER E. KELLEY.